United States Patent [19]

Nakanishi et al.

[11] Patent Number: 5,663,850
[45] Date of Patent: Sep. 2, 1997

[54] CARTRIDGE HANDLING APPARATUS

[75] Inventors: Yasuyuki Nakanishi; Koutarou Oka; Kei Shirahata; Shigehiro Itou, all of Hyogo; Tatsunori Fujiwara, Tokyo, all of Japan

[73] Assignee: Mitsubishi Denki Kabushiki Kaisha, Tokyo, Japan

[21] Appl. No.: 541,154

[22] Filed: Oct. 11, 1995

[30] Foreign Application Priority Data

Oct. 14, 1994 [JP] Japan ................... 6-249457

[51] Int. Cl.⁶ ................... G11B 15/68; G11B 17/22
[52] U.S. Cl. ................... 360/98.06; 369/191; 360/99.06
[58] Field of Search ................... 369/34, 36, 38, 369/191, 192, 194; 360/98.04, 98.06, 92, 99.02, 99.06

[56] References Cited

U.S. PATENT DOCUMENTS

| | | | |
|---|---|---|---|
| 4,974,102 | 11/1990 | Hamachi et al. | 360/92 |
| 5,006,940 | 4/1991 | Hamachi et al. | 360/92 |
| 5,493,556 | 2/1996 | Aoki et al. | 369/191 |

FOREIGN PATENT DOCUMENTS

| | | |
|---|---|---|
| 64-89065 | 4/1989 | Japan. |
| 64-89066 | 4/1989 | Japan. |
| 3-222141 | 10/1991 | Japan. |

*Primary Examiner*—Robert S. Tupper
*Assistant Examiner*—William J. Klimowicz

[57] ABSTRACT

In an auto-changer device performing sequential reproduction by loading multiple cartridges each of which has an internal disk, a cartridge handler includes a plurality of holders which hold a cartridge; a plurality of pins asymmetrically fixed to the holder; guide plates having guide grooves for guiding the pins; and a loading hook, which engages and holds a cartridge and which is driven by the force exerted by a spring that also ejects the cartridge, whereby the structure of a cartridge changer can be simplified so that it is not required that the carrier have a plurality of holding functions and the carrier can be moved up and down at the unloading completion position, and the operational time can be shortened.

11 Claims, 11 Drawing Sheets

CARTRIDGE HANDLING APPARATUS

FIELD OF THE INVENTION

This invention relates to a cartridge changer for an auto-changer device into which are loaded multiple cartridges, in each of which is stored, so that sequential reproduction or successive play of them can be performed, a cassette tape, a disk, etc.

DESCRIPTION OF THE RELATED ART

Generally, in an auto-changer device into which are loaded multiple cartridges, which each contain a cassette tape or a disk so that sequential reproduction or successive play of them can be performed, first, a cartridge is inserted into a holder that holds the cartridge. For example, there are five such holders provided for quintuple sequential reproduction.

The position of a cartridge that is inserted into the holder is a cartridge inserted position. The waiting position is a temporary standby position for reproduction. When, for reproduction, a desired cartridge is selected, the cartridge is conveyed, with its holder, by a catcher to a reproduction position where that cartridge is set up for reproduction.

Because the cartridge is moved back and forth between the reproduction position and the waiting position, that movement must be smoothly performed.

In other words, the cartridge is controlled by a feeding mechanism that is constituted by a holder and a catcher.

One example of such a feeding mechanism is described in Japanese Patent Publication Laid Open No. Sho 64-89065, U.S. Pat. No. 4,974,102 or U.S. Pat. No. 5,006,940, upon which the following outline for a cassette tape cartridge, a holder, and a catcher will now be explained by referring to FIGS. 18 and 19.

Figure 18:
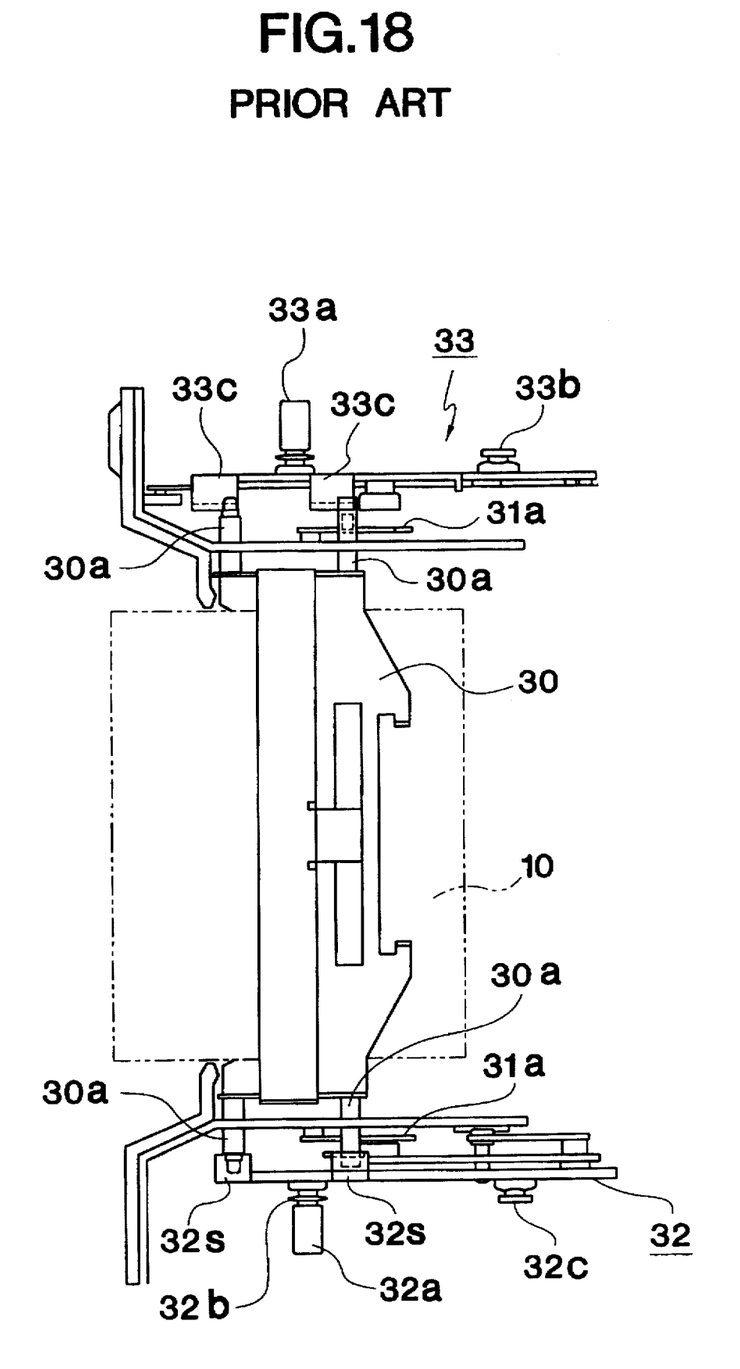
FIG. 18 is a front view of a conventional auto-changer device.

FIG. 18 is a front view for the essential portion of a conventional feeding mechanism in the above example. The feeding mechanism has a cartridge 10 which is inserted from the left side shown in FIG. 18, and a holder 30. Two guide pins 30a are provided on respective sides of holder 30. A pair of catchers 32 and 33 have pins 32a, 32c and pins 33a, 33b which are provided on the right and left sides of the catchers 32 and 33, respectively.

Figure 19:
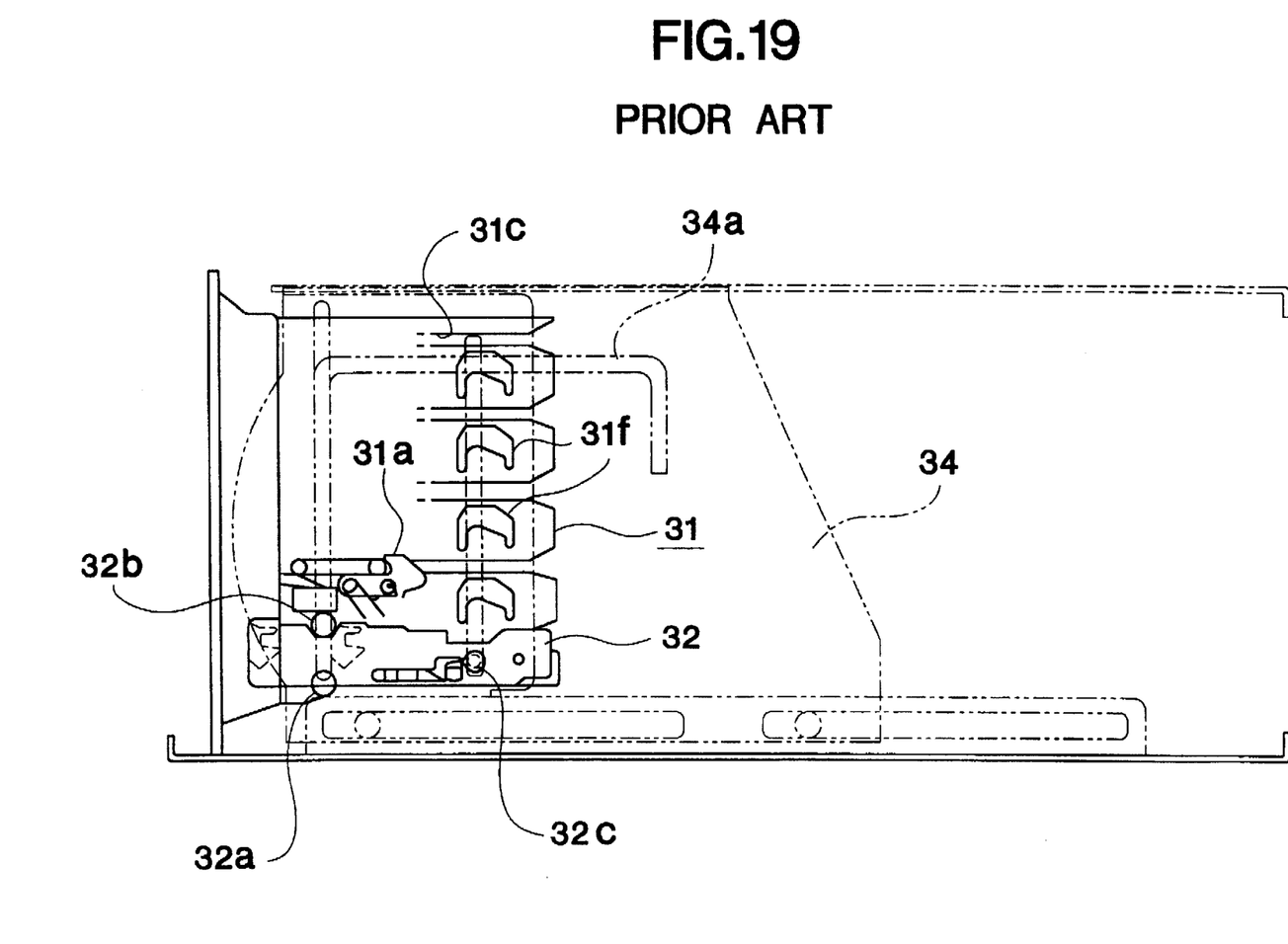
FIG. 19 is a side view of the conventional auto-changer device shown in FIG. 18.

FIG. 19 is a right side view of the feeding mechanism of FIG. 18. A lock lever 31a engages one of the guide pins 30a of the holder 30. The holder 30 is temporarily supported by the lock lever 31a. A shaft 32a of the catcher 32 is passed through a guide hole 34a in a side plate 34.

Processing of the cassette tape traveling mechanism with the arrangement shown in FIGS. 18 and 19 will be briefly described. For setting the holder 30 in the cassette tape traveling mechanism as to shift the holder 30 to the reproduction position, when the holder 30 is to be moved to the right in FIG. 18, the locking of the lock lever 31a is released by a cam face 31f in FIG. 19, the right guide pin 30a is held by an engagement portion 32s of the catcher 32 in FIG. 18 and the left guide pin 30a is held by an engagement portion 33c of the catcher 33, the holder 30 is mounted on the catchers 32 and 33 and is shifted with the catchers 32 and 33 by the operation of a loading arm, and the holder 30 that contains a cartridge is set at the reproduction position.

As is apparent from FIGS. 18 and 19, a shortcoming of the conventional cartridge changer is that the holder 30, the catchers 32 and 33, the associated mechanism, and side plates 34 are large and the structure of the device is complicated.

In addition, in the other conventional cartridge changer, a catcher 33 in which a holder 30 is retained is fixed to a chassis at the standby position for a cartridge, while a floating deck, which is located on the side of a reproduction section of a disk, must be in the floating state because a vibration protect function is required when reproduction is performed. Thus, between the catcher 33 and the floating deck is formed a gap as a variable space for the vibration protection function.

Further, a guide along which guide pins 30a slide is provided on the floating deck to feed the holder smoothly. Since grooves to which front and rear pins are fit are formed in the guide, and the rear pin has to pass across the gap at the groove for the front pin, this results in operational failures and an increase in the load. For example, when the holder 30 passes across the gap, the guiding of the pin 30a is discontinuous and the pin 30a, therefore, may be either dropped or caught in this gap.

Therefore, the following countermeasures have been considered.

As the first countermeasure, a member to protect against falling was provided. Since by this method the falling protection member is retracted to another position when the vibration protection function is performed, a disadvantage exists in that the number of parts is increased and extra space is required.

As the second countermeasure, a method to narrow a gap by moving a deck to the front during the feeding operation was considered. However, by this method, the load that is imposed when a load is moved is increased, and the power that is consumed is increased, which causes more heat to be generated in the associated circuitry.

As the third countermeasure, a guide pin was so formed that its diameter was larger than a gap. However, for the movement of a pin that has a large diameter, a disadvantage exists in that dead space is increased, extra space is required, and the width of the partition of the holder catcher is narrowed whereby strength is decreased.

As another problem, even if a holder can be prevented from falling and can be moved stably, since it is common with a conventional structure for a single spring to be provided in the holder to hold a cartridge, the force for holding the cartridge at the ejected position is the same as that at the insertion position. Thus, relative to the holding force of the cartridge in the holder at the insertion position, if that force is increased and stabilized, in a counter action, the cartridge insertion/extraction force at the ejected position is increased whereby the operational feel deteriorates.

If the holding force at the ejected position is decreased to reduce resistance, the cartridge holding force at the insertion position is decreased, and when the cartridge is removed by force, or due to the vibration, the holder is caused to shift, so that the holder interferes with the other parts when it is moved, or a cartridge or a disk cannot be exactly loaded into a predetermined position on a turntable.

SUMMARY OF THE INVENTION

This invention is made to solve the above-described problems. It is an object of the invention to obtain a cartridge changer where operational failure of a mechanism seldom occurs and there is not a very great increase in a load when a holder in which a cartridge is mounted is fed into the mechanism.

It is another object to provide a structure that does not require a member to prevent a holder from falling.

It is a further object to make a compact, simple holder.

It is a still further object to provide a satisfactory feel for the operation of a holder.

A cartridge handler according to the invention includes a holder into which a cartridge is inserted and held; a plurality of pins fixed on opposing sides of the holder; a holder catcher for engaging and holding pins of the holder at a standby position of the holder; and a pair of guide plates for guiding the plurality of pins when the cartridge is fed, whereby the guide plates and the holder catcher form gaps therebetween. When the holder containing the cartridge is fed to a position for reproduction, and when a predetermined pin of the plurality of pins passes one of the gaps, at least three pins of any remaining pins are supported at three points by the holder catcher and the guide plates.

A cartridge changer according to the invention may also include a plurality of holders, in each of which a cartridge is inserted and held; a plurality of pins that are asymmetrically fixed to each of the plurality of holders; a pair of guide plates in which are guide grooves, respectively, and along which the plurality of pins slide and are guided when a predetermined holder is fed, and along which the predetermined holder is guided to a fixed position when the feeding of the holder is completed; and a holder catcher, which engages and holds the plurality of pins at a standby position for the plurality of holders, characterized in that the plurality of pins are passed across the gaps, which are located between the guide plates and the holder catcher, and the guide grooves when the predetermined holder into which the cartridge is loaded is fed.

In addition, with a cartridge changer according to the invention, a plurality of pins are employed, which are asymmetrically fixed to a holder into which a cartridge is inserted and held, so that when the cartridge is fed, it slides to a guide plate and a holder catcher, being supported by at least three locations by the pins, whereby the holder can stably move to the front and to the rear. Thus, even when one of the pins passes across the gap, a flat plane is maintained by the other pins, the pins do not fall down through the gap, and also, a holder that can be held stable even when there is vibration can be acquired.

Further, with a cartridge changer according to the invention, when the cartridge is held in the holder, the cartridge is held at the ejected position by a relatively weak holding force in order to reduce the cartridge insertion and extraction force, while the cartridge is held by a greater holding force at the inserted position so as not to extract the cartridge or to shift the cartridge in the holder. A spring for discharging a cartridge is also used as a spring for holding the cartridge, whereby the holder is supported by a reduced number of parts when compared with known devices, and a preferable operation of the device can be provided to the user.

A cartridge changer according to the invention may also include a plurality of holders, in each of which a cartridge is inserted and held; a plurality of pins that are asymmetrically fixed to each of the plurality of holders; a pair of guide plates in which are provided guide grooves, respectively, and along which the plurality of pins slide and are guided when a predetermined holder is fed, and along which the predetermined holder is guided to a fixed position when the feeding of the holder is completed; a first spring, for each of the holders, that has one end fixed to the holder and that is employed to forcibly eject the cartridge and to hold the cartridge at an ejected position; an ejection plate for engaging an end portion of the cartridge; a plurality of ejection levers respectively provided for the plurality of holders; a second spring for driving the ejection levers; and a lock plate, which is impelled by the urging force of the second spring, wherewith a loading hook is fitted into a retaining hole of the cartridge by the first spring pushing the cartridge to the rear in order to provide a cartridge ejected position, and wherewith, by impelling the cartridge against the force of the first spring, the cartridge is so brought into contact with the ejection plate as to slide the ejection plate and to rotate the lock plate, while, when the lock plate slides and reaches a notch in the ejection plate, the lock plate is rotated, by the force of the second spring, in the opposite direction via the ejection levers and contacts the end of the notch of the ejection plate, to prevent the ejection plate from being moved by the force of the first spring, and to provide a cartridge inserted position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

In all figures, the same and the substantially same elements are designated with the same reference numbers.

DESCRIPTION OF PREFERRED EMBODIMENTS

Embodiment 1

The arrangement of a holder and the feeding processing for the holder according to an Embodiment 1 of the invention will now be described while referring to FIGS. 1 to 12.

Figure 1:
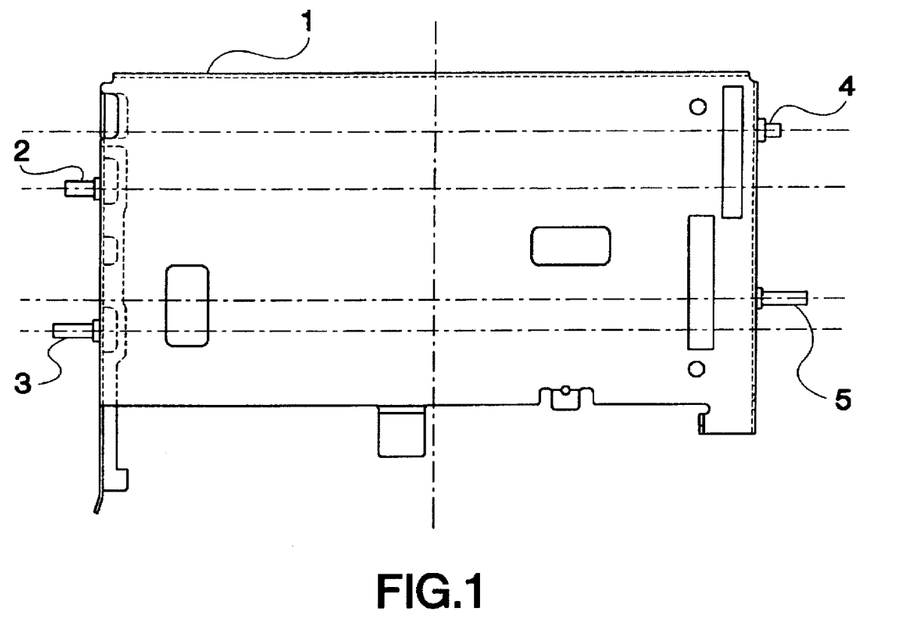
FIG. 1 is a plan view of a holder according to one embodiment of the invention.
Figure 2:
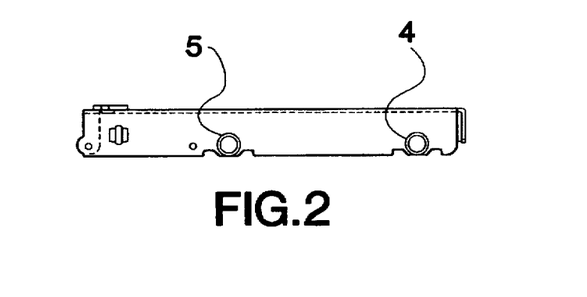
FIGS. 2 and 3 are right and left side views of the holder shown in FIG. 1.
Figure 3:
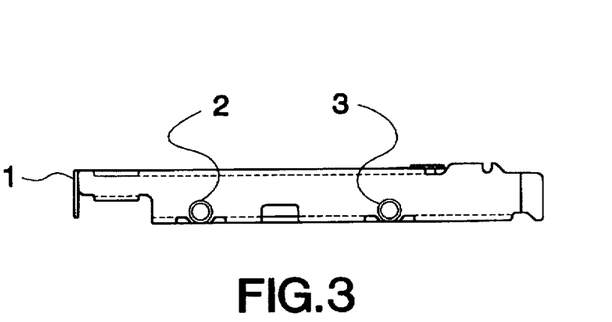

FIGS. 1, 2, and 3 are a plan, a right side and a left side view of the holder 1 in Embodiment 1. A holder 1 holds a cartridge 10 which may include, for example, a cassette tape, disk, etc.

In FIGS. 1 to 3, the holder 1 is shown wherein pins 2, 3, 4, and 5 are fixed to the holder 1. The pins 2 and 4 are at the rear of the holder 1 and the pins 3 and 5 are at the front of the holder 1 and are not located symmetrically with respect to their center axes in the moving direction. Instead, pins 2 and 4 and pins 3 and 5 are located asymmetrically whereby the respective axes of the pins are shifted forward and backward relative to one another as shown in FIG. 1.

Figure 4:
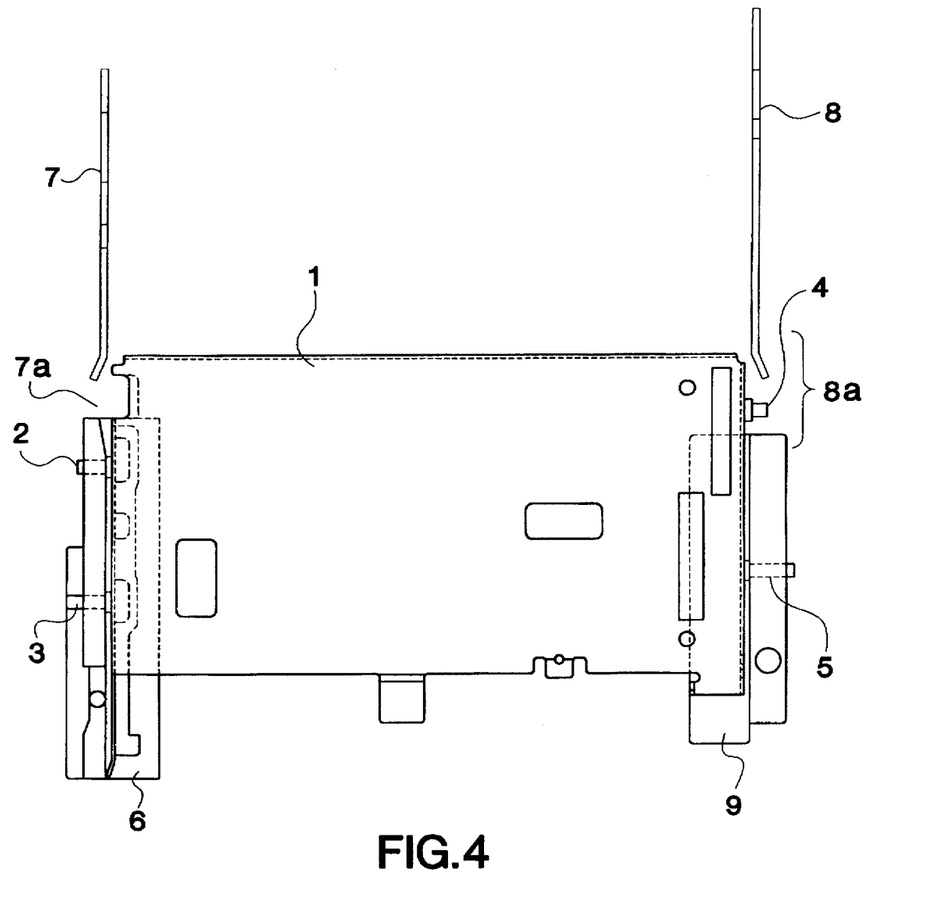
FIG. 4 is a plan view of the holder and a holder catcher according to the embodiment of the invention.
Figure 5:
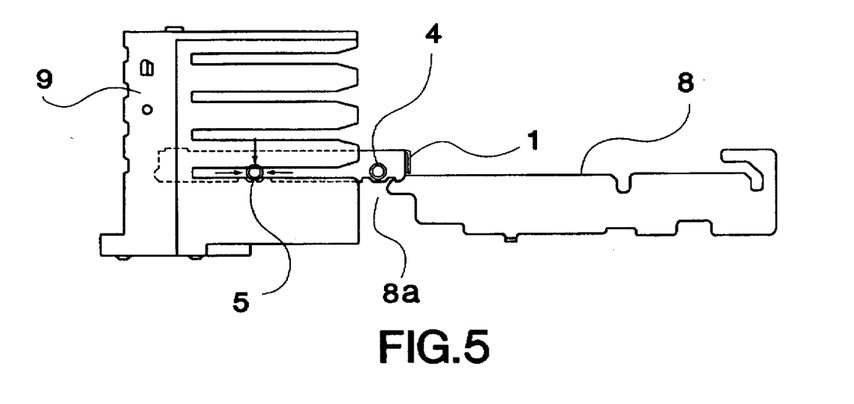
FIG. 5 is a right side view of the holder and the holder catcher shown in FIG. 4.
Figure 6:
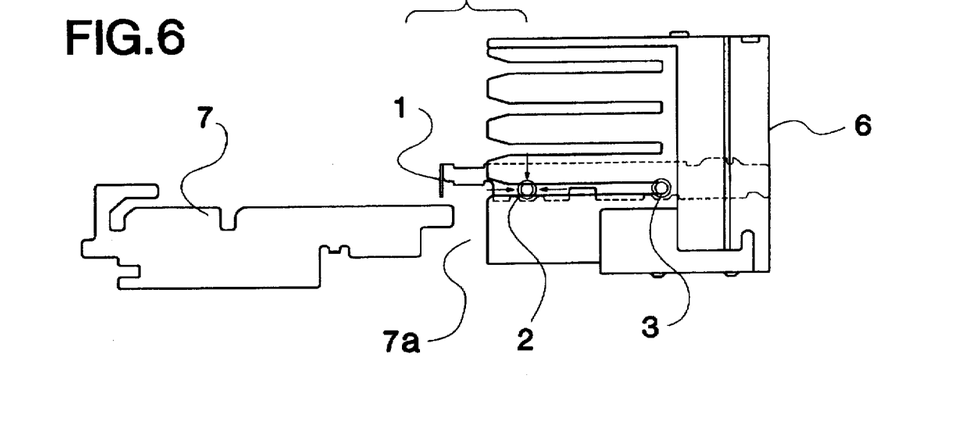
FIG. 6 is a left side view of the holder and the holder catcher shown in FIG. 4.

The feeding operation for the holder 1 will be explained while referring to FIGS. 4, 5, and 6. In FIGS. 4 to 6, a left holder catcher 6 and a right holder catcher 9 engage the holder 1; a left guide plate 7 guides pins 2 and 3 so as to feed the holder 1 to a reproduction position; and a right guide plate 8 guides pins 4 and 5 so as to feed the holder 1 to the reproduction position.

It should be noted that during feeding, a carrier (not shown) controls the pins 2 and 5 in three directions indicated by the arrows shown in FIGS. 5 and 6.

In FIGS. 4, 5, and 6, when the holder 1 is being fed, the pin 4 is moved across a gap 8a that is defined by the space between right holder catcher 9 and the right guide plate 8 and thus the movement of the pin 4 is not then controlled. However, the pins 2 and 3 (of the remaining pins 2, 3, and 5) are guided by the left holder catcher 6 and the pin 5 is guided by the right holder catcher 9, so that a flat plane is defined by the three-point support provided by the three pins (2, 3, and 5). Therefore, up-and-down displacement of the holder 1 does not occur, and the pin 4 is neither dropped into the gap 8a nor caught in the gap 8a.

Figure 7:
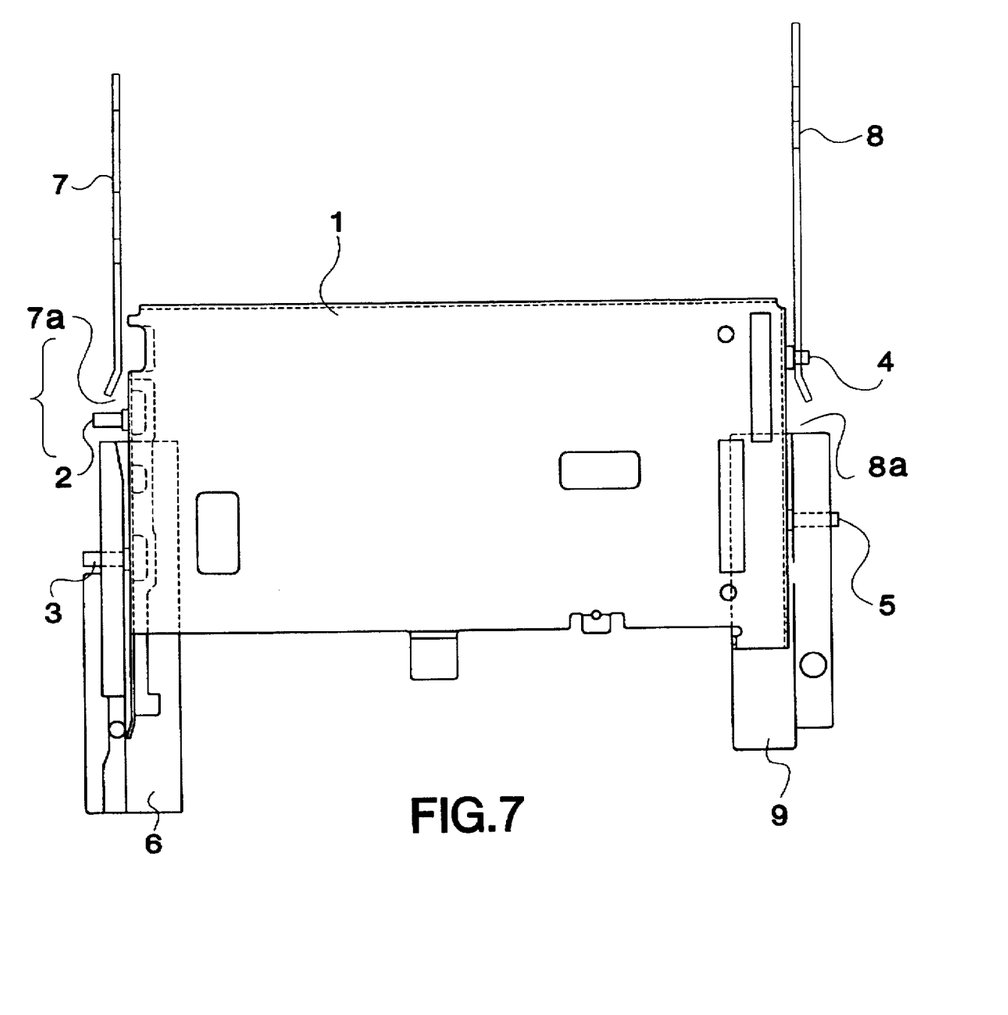
FIG. 7 is a plan view of the holder and the holder catcher according to the embodiment of the invention.
Figure 8:
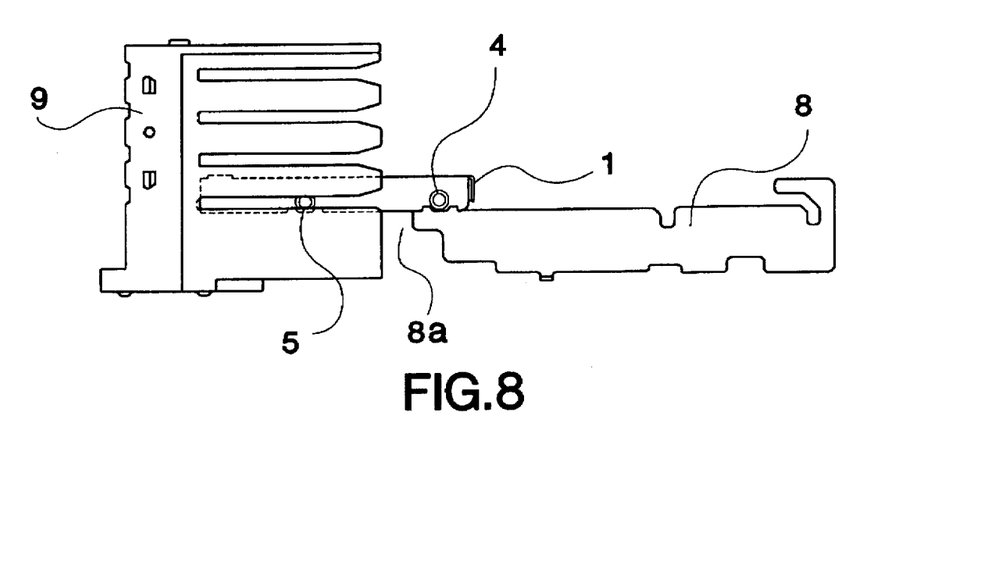
FIG. 8 is a right side view of the holder and the holder catcher shown in FIG. 7.
Figure 9:
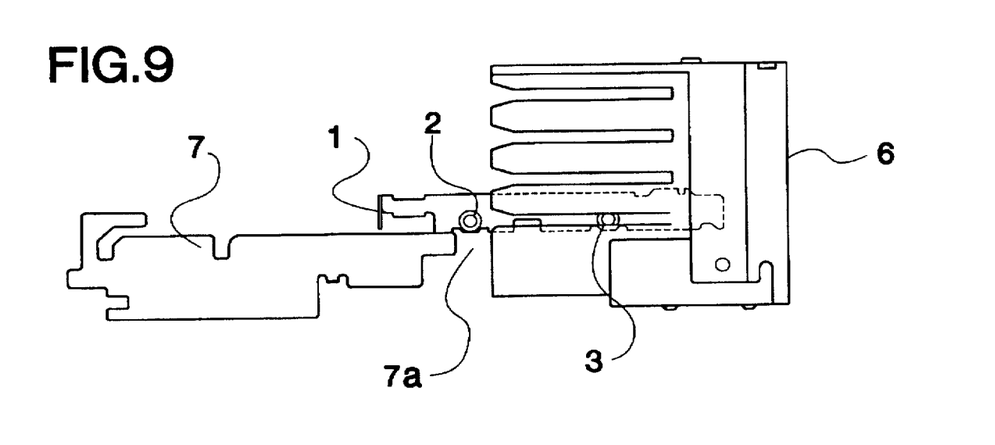
FIG. 9 is a left side view of the holder and the holder catcher shown in FIG. 7.

Further, the state when the holder 1 is advancing in route to the rear is shown in FIGS. 7, 8, and 9.

In FIGS. 7, 8, and 9, the holder 1 is fed further and the pin 2 is moved across a gap 7a that is defined by the space between left holder catcher 6 and the left guide plate 7 and thus the movement of pin 2 is not controlled. However, the pin 3 is guided by the left holder catcher 6, the pin 4 is guided along the right guide plate 8, and the pin 5 is guided by the right holder catcher 9, so that a flat plane is defined by these three pins (3, 4, and 5). Thus, the up-and-down displacement of the holder 1 does not occur, and the pin 2 neither drops into the gap 7a nor caught in the gap 7a.

A carrier (not shown) is employed to control the upper portions of the pins 2, 3, 4, and 5 along the guide plates 7 and 8.

Figure 10:
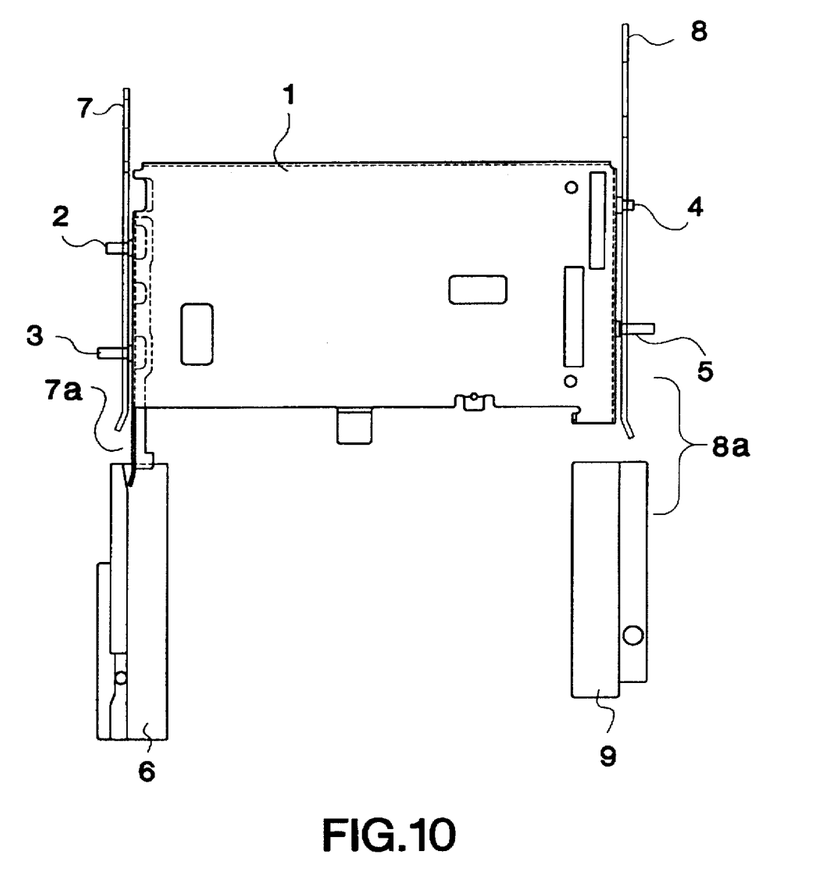
FIG. 10 is a plan view of the holder and the holder catcher according to the embodiment of the invention.
Figure 11:
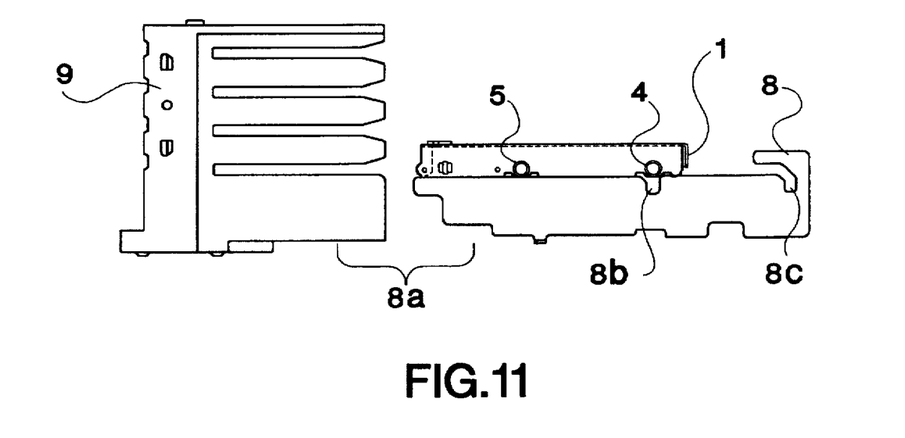
FIG. 11 is a right side view of the holder and the holder catcher shown in FIG. 10.
Figure 12:
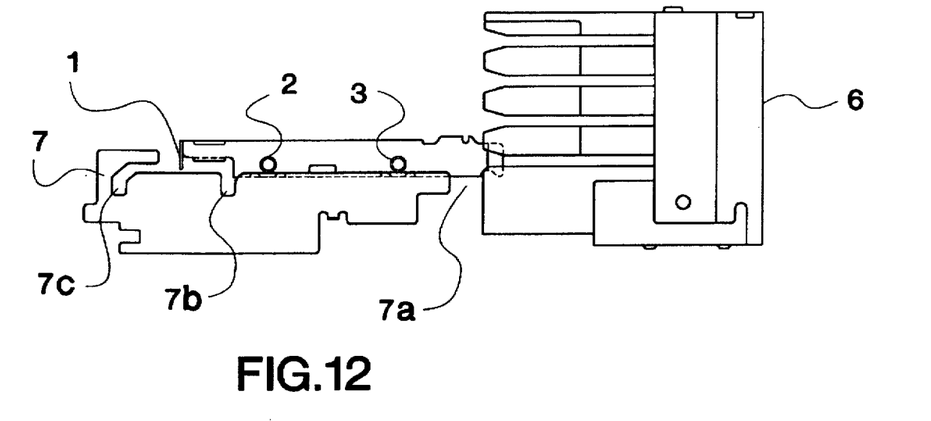
FIG. 12 is a left side view of the holder and the holder catcher shown in FIG. 10.

The state where the holder 1 is fed even further to the rear is shown in FIGS. 10, 11, and 12.

In FIGS. 10, 11, and 12, the holder 1 is fed even further and the pin 4 passes over a guide groove 8b in the right guide plate 8. At this time, although there is no support beneath the pin 4, the pins 2 and 3 are guided along the left guide plate 7 and the pin 5 is guided along the right guide plate 8, so that a flat plane is defined by the three-point support that is provided by the three pins. Therefore, the up-and-down displacement of the holder 1 does not occur, and the pin 4 neither drops into the guide groove 8b nor is it caught in guide groove 8b. The pin 2 also passes over a guide groove 7b in the left guide plate 7 in the same manner as pin 4 passes over guide groove 8b in the right guide plate 8.

As is described above, because the four pins pass across the gaps 7a and 8a at different times, there are constantly three or more pins being guided and supported. Thus, a flat plane is provided for the holder 1 by at least a three-point support to maintain a stable support condition.

When the flat plane of the holder 1 is ensured by three-point support and a plurality of pins that are fixed to the sides of the holders are asymmetrically located, the pins do not fall into the gaps and the holder 1 is stably supported.

In addition, to prevent the holder 1 from falling into gaps 7a and 8a, a plurality of pins of the holder 1 are so located that, when the holder 1 is moved toward the guide plates 7 and 8 as shown in FIGS. 4 through 12, the pins do not fall into the gap 7a between the left holder catcher 6 and the left guide plate 7 or into the gap 8a between the right holder catcher 9 and the right guide plate 8, and can also pass over the guide grooves 7b and 8b.

Further, when four pins are employed, they are so located that two of them cannot fall into a gap at the same time.

In the loaded state when the holder has reached the rearmost reproduction position, because the guide grooves 7b, 8b, 7c and 8c, along which a plurality of pins are slid and guided during the feeding of a cartridge, are provided in the left and the right guide plates 7 and 8, the pin 2 is fitted into the guide groove 7c, the pin 4 is fitted into the guide groove 8c, the pin 3 is fitted into the guide groove 7b, and the pin 5 is fitted into the guide groove 8b, so that the holder 1 is held in place by the grooves and its position cannot be shifted.

For reproduction involving cartridges that are loaded in the holder catcher 9, the positions of the guide plates 7 and 8 relative to those of other holders 1 are matched, and only the same feeding processing need be performed for each of the other holders 1.

Embodiment 2

The arrangement of the inserted, standby and ejected positions for a cartridge, and the processing for them will now be explained as Embodiment 2 of the present invention while referring to FIGS. 13 through 17.

Figure 13:
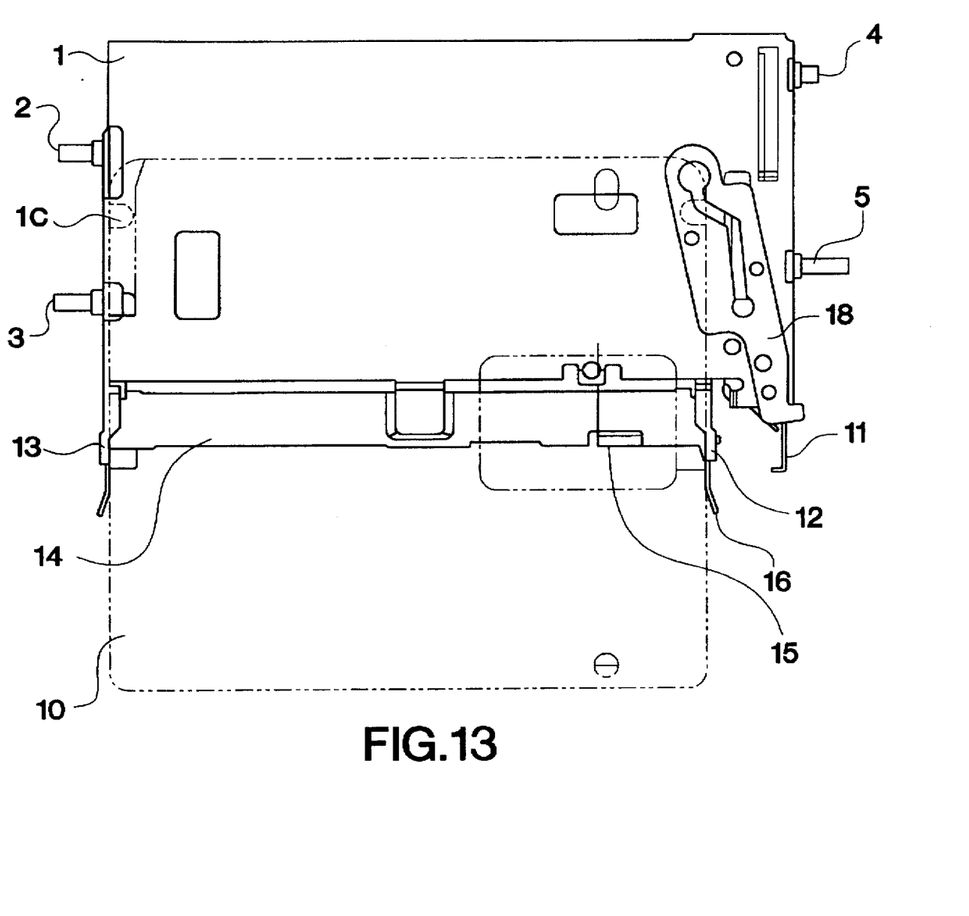
FIG. 13 is a plan view of the inserted position of a cartridge according to another embodiment of the invention.
Figure 14:
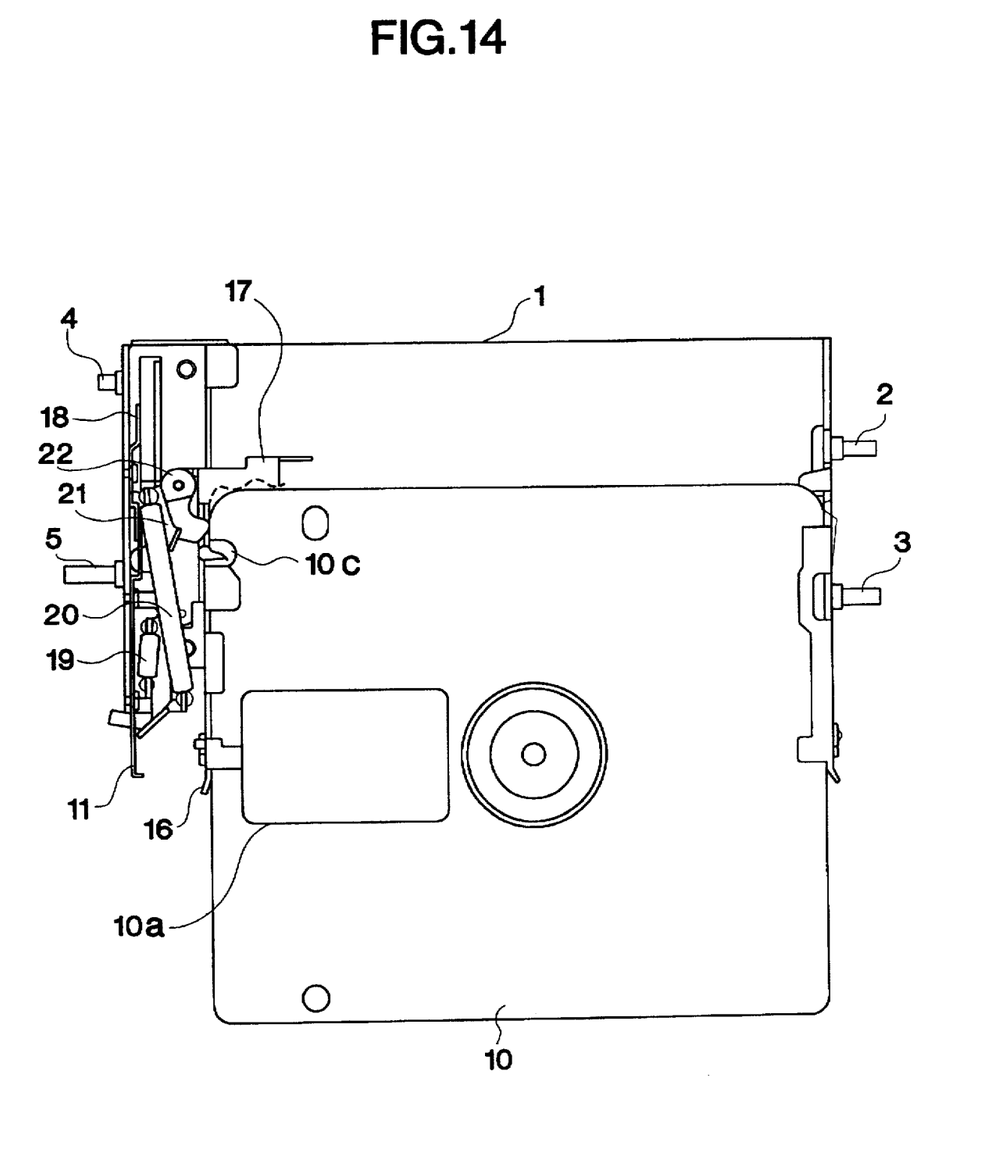
FIG. 14 is a bottom view of the state where the cartridge is being inserted according to the embodiment of the invention shown in FIG. 13.

FIG. 13 is a plan view of the inserted position of the cartridge and FIG. 14 is a bottom view of FIG. 13. The holding of the cartridge 10 at the ejected position will now be explained.

In FIGS. 13 and 14, a cartridge handler includes; an ejection lever 11 provided for the holder 1 that is slidable; a leaf spring 12 for closing a shutter 10a of the cartridge 10; a leaf spring 13 holding the cartridge 10 in the holder 1 in the inserted state; a door 14 provided with the holder 1; a spring 15 pushing the door 14 in the direction of closing; a guide portion 16, on the right side of the holder 1 that serves as a guide for the insertion of cartridge 10; and an ejection plate 17 (shown in FIG. 14). A lock plate 18 is provided for the holder 1 that is rotatable and which has one end coupled with the ejection lever 11 and that employs the other end to control the movement of the ejection plate 17 in the discharge direction. A second spring 19 forces the lock plate 18, via the ejection lever 11, in a direction in which the discharge operation of the ejection plate 17 is controlled. A first spring 20 forces the ejection plate 17 in the ejection direction and at the same time forces the loading hook 22 to rotate; a hook plate 21 is provided for the ejection plate 17 so that it is rotatable; and a loading hook 22 is provided that functions the same as the hook plate 21.

In FIG. 13, when the cartridge 10 is inserted into the holder 1, the holder 1 and its guide portion 16 are employed as guides to open upward the door 14 at the front of the holder 1. The spring 15 urges the door 14 in the direction of closing.

FIG. 14 is a bottom view of FIG. 13, showing the state when the loading hook 22 is in contact with the corner of the cartridge 10. As the cartridge 10 is inserted into the holder 1 and is pushed in, the loading hook 22, which is driven by the first spring 20 via the hook plate 21, is opened counterclockwise. When the cartridge 10 is further inserted, the loading hook 22 fits into a retaining hole 10c in the cartridge, so that the cartridge 10 is held in the holder 1.

The maintaining at the cartridge insertion position will now be explained while referring to FIGS. 15 and 16.

Figure 15:
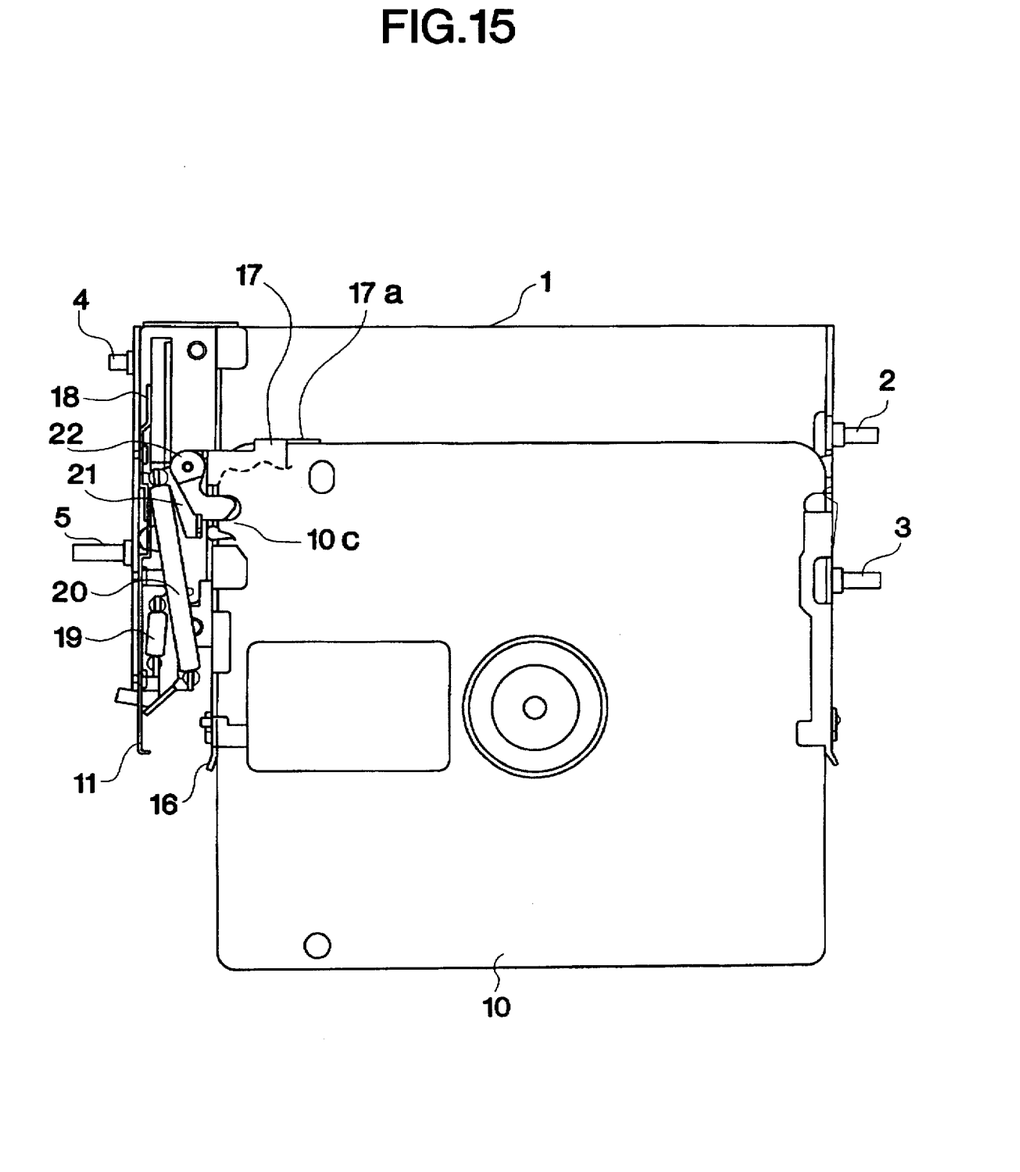
FIG. 15 is a bottom view of the ejected position of the cartridge according to the embodiment of the invention shown in FIG. 13.
Figure 16:
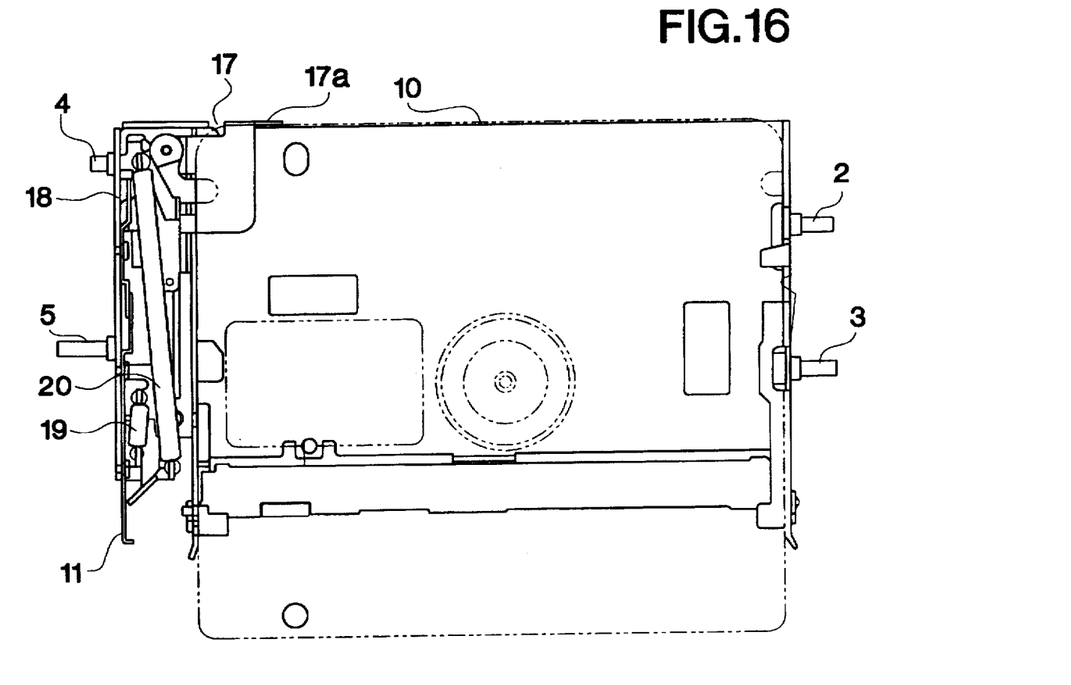
FIG. 16 is a bottom view of the state where the cartridge is held according to the embodiment of the invention shown in FIG. 13.

When the cartridge 10 is pushed further against the force exerted by the spring 20 from the state shown in FIGS. 13 and 14, the cartridge 10 abuts upon an end 17a of the ejection plate 17 as shown in FIG. 15, the ejection plate 17 slides to the rear, and the lock plate 18 is rotated and is slid into the notch 17c in the ejection plate 17. The lock plate 18 is rotated by the force exerted by the second spring 19 via the ejection lever 11, so as to contact the ejection plate 17 and lock it at the inserted position (FIG. 16).

Figures 17A, 17B:
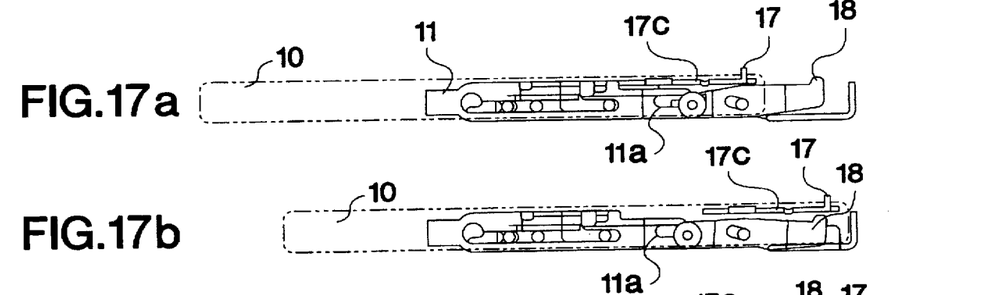
FIGS. 17a, 17b, 17c and 17d are side views of the movement of an ejection lever according to the embodiment of the present invention.
Figures 17C, 17D:
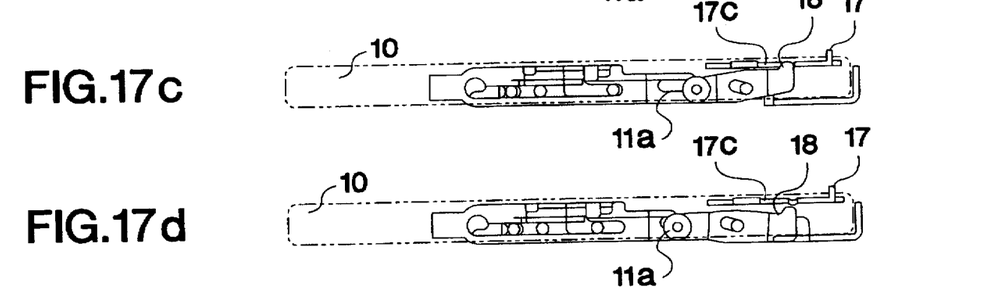

The ejection processing will now be explained while referring to FIGS. 17a through 17d. FIG. 17a shows the state where the cartridge 10 is ejected and is extended the farthest towards the outside of the holder 1. FIG. 17b shows the state where the cartridge is being inserted, and the distal end of the lock plate 18 abuts upon the rear face of the ejection plate 17. FIG. 17c shows the position at which the cartridge insertion has been completed. The distal end of the lock plate 18 is inserted into a notch 17c of the ejection plate 17 and drops into an inclined portion of the cam groove 11a of the ejection lever 11.

FIG. 17d shows the state where the ejection lever is pushed in. As the ejection lever 11 is slid to the rear, the lock plate 18 is rotated by the cam groove 11a in the direction in which it is separated from the ejection plate notch 17c, so that the locking of the ejection plate 17 is released.

As is shown in FIGS. 17a and 15, the ejection plate 17 is released from its locked state and is then moved to its original ejected position by the first spring 20 shown in FIG. 15.

As is described above, according to the Embodiment 2, a first spring 20 is provided that has one end fixed to each of the holders 1, into which the cartridge 10 is inserted and then held, and that is employed to forcibly eject the cartridge and to maintain it at the ejected position, and the loading hook 22 is provided that is connected to the other end of the first spring 20 and that engages the retaining hole 10c in the cartridge as the cartridge 10 is pushed into the rear. Therefore, a cartridge handler can be provided in which the spring that is used to eject the cartridge can also be used as the spring for holding the cartridge, and that can be made simply and compactly because of the reduction in the number of parts.

Further, according to Embodiment 2, the first spring 20, which has one end fixed to the holder 1 and which is employed to forcibly eject the cartridge 10 and to maintain it at the ejected position; the ejection plate 17, which engages the end of the cartridge; the ejection levers 11, which are provided for each of the holders 1, the second spring 19, which drives the ejection lever 11; and the lock plate 18, which is driven by the force of the first spring 20, are included.

As the cartridge 10 is pushed in and to the rear by the first spring 20, the loading hook 22 engages the retaining hole 10c in the cartridge 10 to form the ejected position for the cartridge 10. Further, as the cartridge 10 is pushed in against the force exerted by the first spring 20, the cartridge 10 abuts upon the ejection plate 17, which then slides to rotate the lock plate 18. When the lock plate 18 has reached the notch 17c in the ejection plate 17, the lock plate 18 is then rotated in the opposite direction by the force exerted by the second spring 19 via the ejection lever 11, and is brought into contact with the ejection plate 17, which is prevented from being moved by the force exerted by the first spring 20, so that the cartridge inserted position is thus achieved.

Therefore, the holding force of the cartridge is set so that it is weak at the ejected position and strong at the inserted position, and the feel of the insertion/extraction operation at the ejected position is satisfactory, while at the inserted position the forcible extraction of the cartridge 10 from the holder 1 is prevented.

These embodiments of the invention having the above-described structure have the following advantages.

(1) In the cartridge handler provided in the first aspect of the invention, a three-point support is ensured by fixing a plurality of pins to a holder so that they are asymmetrically positioned, and the prevention of the falling of the holder can be achieved without requiring any additional structure.

In addition, the invention can be made simply and compactly by employing a spring to hold a cartridge that is also used to eject a cartridge.

(2) In the cartridge handler provided in the second aspect of the invention, the holding force of a cartridge at the ejected position is set so that it is weak and the holding force at the insertion position is set so that it is strong, whereby the feel of the operation for the cartridge insertion/extraction at the ejected position is satisfactory, and the forcible extraction of a cartridge from the holder can be prevented at the inserted position.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cartridge handling apparatus, comprising:
   a plurality of holders, in each of which a cartridge is inserted and held;
   a plurality of pins that are fixed to each of said plurality of holders;
   a pair of guide plates having respective guide grooves along which said plurality of pins slide and are guided when a predetermined holder is fed whereby said predetermined holder is guided to a fixed position when the feeding of said predetermined holder is completed;

an ejection plate, for each of said plurality of holders, engaging an end portion of the cartridge and being slidable with respect to each corresponding holder;

a first spring, for each of said plurality of holders, having one end fixed to each of said holders and the other end fixed to said ejection plate for forcibly ejecting the cartridge and holding the cartridge at an ejected position;

a loading hook, for each of said plurality of holders, rotatably driven by said first spring via said ejection plate such that said loading hook is urged into a retaining hole of said cartridge when said cartridge is inserted into a corresponding one of said plurality of holders.

2. A cartridge handling apparatus, comprising: a plurality of holders, in each of which a cartridge is inserted and held;

a plurality of pins that are fixed to each of said plurality of holders;

a pair of guide plates having respective guide grooves along which said plurality of pins slide and are guided when a predetermined holder is fed whereby said predetermined holder is guided to a fixed position when the feeding of said predetermined holder is completed;

each of said plurality of holders including:

a first spring having one end fixed to said holder for forcibly ejecting the cartridge and holding the cartridge at an ejected position;

an ejection plate engaging an end portion of the cartridge and attached to the other end of said first spring, said ejection plate including a notch;

an ejection lever having a cam groove;

a second spring for driving said ejection lever having one end attached to said holder and the other end attached to said election lever; and a lock plate connected to said ejection lever, said lock plate being impelled by the driving force of said second spring towards a cartridge elected position, said lock plate engaging the cam groove in said ejection lever, a loading hook biased into a retaining hole of the cartridge by said first spring and wherein by impelling the cartridge against the force of said first spring, the cartridge is brought into contact with said ejection plate so as to slide said ejection plate so that the cam groove in said ejection lever rotates said lock plate, while, when said lock plate slides and reaches the notch in said ejection plate, said lock plate is rotated by the force of said second spring via the cam groove in said ejection lever and engages the notch of said ejection plate, to prevent said ejection plate from being moved by the force of said first spring, and to provide a cartridge inserted position.

3. An apparatus for loading and unloading a cartridge into a reproducing device, comprising:

a cartridge holder having a cartridge removably disposed therein, left pins connected to the left side of said cartridge holder, right pins connected to the right side of said cartridge holder, a left cartridge holder receiver receiving and guiding said left pins of said cartridge holder from an unloaded state to a partially loaded state, a right cartridge holder receiver receiving and guiding said right pins of said cartridge holder from an unloaded state to a partially loaded state, a left guide plate guiding said left pins of said cartridge holder from a partially loaded state to a loaded state, a right guide plate guiding said right pins of said cartridge holder from a partially loaded state to a loaded state, a slidable ejection plate contacting said cartridge as said cartridge is fed into said cartridge holder, a loading hook rotatably disposed on said ejection plate and engaging a retaining hole provided on said cartridge when said cartridge is in the loaded state, a hook plate rotatably disposed on said ejection plate, and a first spring having one end fixed to said cartridge holder and the other end fixed to said hook plate wherein said first spring urges the cartridge holder into the unloaded state and urges, via said hook plate, said loading hook to engage the retaining hole, wherein a space between said left cartridge holder receiver and said left guide plate defines a left gap, wherein a space between said right cartridge holder receiver and said right guide plate defines a right gap, wherein said left and right pins are connected to said cartridge holder such that during loading and unloading of said cartridge holder at least three pins are supported by said left cartridge holder receiver said right cartridge holder receiver, said left guide plate, and/or said right guide plate.

4. The apparatus of claim 3, wherein said left and right cartridge holder receivers receive and hold a plurality of said cartridge holders.

5. The apparatus of claim 3, wherein said left pins have respective longitudinal axes which do not intersect with respective longitudinal axes of said right pins.

6. The apparatus of claim 3, wherein said left and right guide plates include respective left and right guide grooves receiving said left and right pins and holding said cartridge holder in the loaded state.

7. The apparatus of claim 3, wherein said left pins include two left pins, wherein said right pins include two right pins, and wherein during loading and unloading of said cartridge holder at least three pins are supported by said left cartridge holder receiver, said right cartridge holder receiver, said left guide plate, and/or said right guide plate.

8. The apparatus of claim 3, further comprising:

a slidable ejection lever;

a cam groove disposed in said slidable ejection lever;

a rotatable lock plate coupled to said cam groove of said ejection lever; and a second spring having one end connected to said cartridge holder and the other end connected to said slidable ejection lever, wherein said second spring urges said rotatable lock plate, via said slidable ejection lever, into engagement with a notch on said ejection plate when said cartridge is inserted into said cartridge holder;

wherein when said slidable ejection lever is actuated, said rotatable lock plate rotates via said cam groove to disengage said rotatable lock plate from said notch on said ejection plate; and whereby upon disengagement of said rotatable lock plate from said notch on said ejection plate, said first spring urges said cartridge into the unloaded state.

9. The apparatus of claim 8, further comprising:

a cartridge holding spring holding said cartridge in said cartridge holder when said cartridge is in the loaded state.

10. An apparatus for loading and unloading a cartridge holder into which a cartridge is inserted and held, comprising:
- a slidable ejection plate contacting said cartridge as said cartridge is fed into said cartridge holder;
- a loading hook rotatably disposed on said ejection plate and engaging a retaining hole provided on said cartridge when said cartridge is in a loaded state;
- a hook plate rotatably disposed on said ejection plate;
- a first spring having one end fixed to said cartridge holder and the other end fixed to said hook plate wherein said first spring urges the cartridge holder into an unloaded state and urges, via said hook plate, said loading hook to engage the retaining hole;
- a slidable ejection lever;
- a cam groove provided in said ejection lever;
- a rotatable lock plate coupled to said cam groove of said ejection lever; and
- a second spring having one end connected to said cartridge holder and the other end connected to said slidable ejection lever wherein said second spring urges said rotatable lock plate, via said slidable ejection lever, into engagement with a notch on said ejection plate when said cartridge is inserted into said cartridge holder,
- wherein when said slidable ejection lever is actuated, said rotatable lock plate rotates via said cam groove to disengage said rotatable lock plate from said notch on said ejection plate, and
- whereby upon disengagement of said rotatable lock plate from said notch on said election plate, said first spring urges said cartridge into the unloaded state.

11. An apparatus for loading and unloading a cartridge into a cartridge holder, comprising:
- an ejection plate slidably connected to the cartridge holder, said ejection plate being moved by said cartridge as said cartridge is loaded into the cartridge holder;
- a first spring having one end fixed to the cartridge holder and the other end fixed to said ejection plate wherein said first spring urges said ejection plate and said cartridge into an unloaded state;
- a slidable ejection lever slidable with respect to the cartridge holder;
- a cam groove provided in said slidable ejection lever;
- a rotatable lock plate coupled to said cam groove of said slidable ejection lever;
- a notch provided on said ejection plate engaging said rotatable lock plate when the cartridge is fully inserted into said cartridge holder;
- a second spring having one end connected to said cartridge holder and the other end connected to said slidable ejection lever wherein said second spring urges said rotatable lock plate, via said slidable ejection lever, into engagement with said notch on said ejection plate when said cartridge is fully inserted into said cartridge holder,
- wherein when said slidable ejection lever is actuated, said rotatable lock plate rotates via said cam groove to disengage said rotatable lock plate from said notch on said ejection plate, and
- whereby upon disengagement of said rotatable lock plate from said notch on said ejection plate, said first spring urges the cartridge into an unloaded state.

* * * * *